Feb. 8, 1938.　　　　　A. C. PURPURA　　　　　2,107,388
TOASTER
Filed Nov. 16, 1934
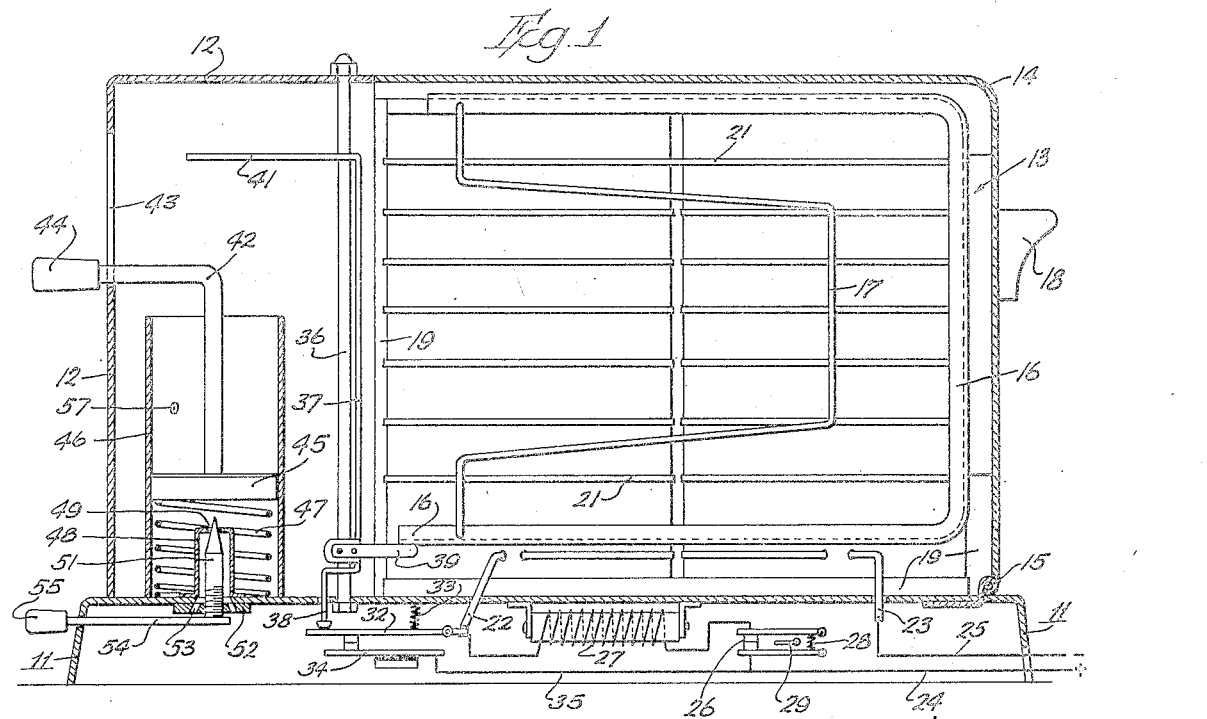
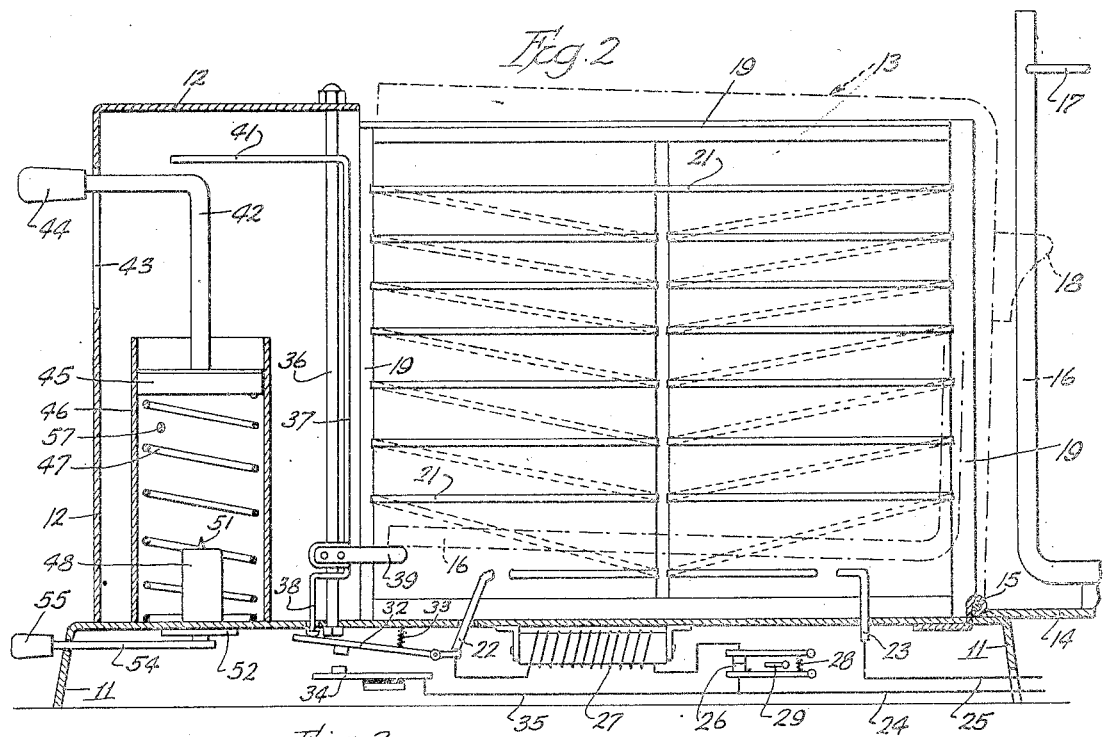
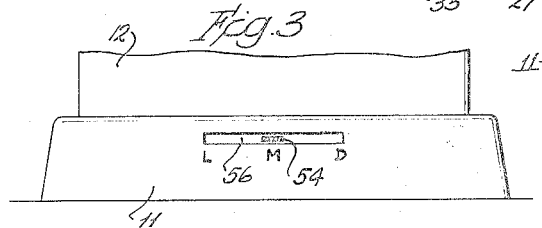
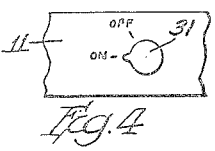
Inventor:
August C. Purpura
Charles B. Rasmussen
Atty.

Patented Feb. 8, 1938

2,107,388

UNITED STATES PATENT OFFICE 2,107,388

TOASTER

August C. Purpura, Chicago, Ill.

Application November 16, 1934, Serial No. 753,335

2 Claims. (Cl. 219—19)

This invention relates in general to bread toasters, and has more particular reference to toasters which may be set for a predetermined period of time to toast the bread to the desired degree of crispness. While the invention is illustrated as embodied in a toaster, it will be manifest that it may be adapted for use in various types of electrical cooking apparatus as well.

A principal object of the invention is the provision of an electric toaster having a control member which may be set to operate after a predetermined time and which will, at the end of such time, cause the current passing through the heating elements to be substantially reduced to prevent damage, such as burning out the elements, should the main switch be inadvertently left on, and at the same time not have the apparatus cool off in the interim between toasting operations as it would do if the supply of current were completely shut off.

Another important object of the invention is the provision in such a toaster of additional mechanism actuated by the control mechanism to shift the bread or other article out of the heating zone at the end of the predetermined time.

Numerous other objects and advantages of the invention will be apparent as it is better understood from the following description, which, taken in connection with the drawing, discloses a preferred embodiment thereof.

On the drawing,

Figure 1 is a side elevation of a toaster embodying my invention, partly in section, and showing the mechanism in operative position;

Fig. 2 is a view similar to Fig. 1 showing the mechanism in a different position;

Fig. 3 is a detail end elevation; and

Fig. 4 is a detail side elevation of the main switch control button.

Referring to the drawing, reference character 11 indicates a hollow base member upon which is mounted in any suitable manner a cover or casing 12 which is open at the right end (Figs. 1 and 2), and for the major portion of the top thereof.

A bread carrying frame or rack 13, having a cover part 14, is pivoted to the base 11 at 15, and when in its closed position (Fig. 1) completely fills the end and top openings in the casing 12. This bread rack 13 further comprises a U-shaped frame 16, secured to the cover part 14 in any suitable manner, to each side of which is attached a wire retaining member 17, and a handle 18. A plurality of pairs of wire retaining members 17 may be provided, depending on the number of slices of bread it is desired to accommodate.

Secured to the base 11 in any suitable manner are a plurality of spaced frame members 19, each of which supports a set of well known heating elements 21 which are electrically connected to positive and negative terminals 22 and 23, respectively. The spacing of these heating elements is such that the pairs of wire retaining members 17 will be positioned between them, respectively, in the usual manner when the bread carrying rack 13 assumes the position of Fig. 1.

The main positive line 24 and negative line 25 are brought in through a suitable opening in the base 11 by an electrical cord (not shown) in the usual manner, with the negative line 25 being directly connected to the terminal 23 of the heating elements 21. The main switch 26 is connected at one side to the positive line 24 and at the other side to a resistance coil 27 which is secured to the under side of the base 11 in any suitable manner. The main switch 26 is urged into closed position by a tension spring 28 and is adapted to be opened and held in such position by a crank rod 29 which is controlled from the exterior of the base 11 by a suitable knob 31. The other end of the resistance coil 27 is connected to the terminal 22 of the heating elements 21, at which point an auxiliary switch element 32 is also electrically connected.

The switch element 32 is normally urged into open or upward position by a tension spring 33. A stationary auxiliary switch element 34 is so positioned as to co-operate with the element 32 when the latter is forced into its lowermost position, as will be later described, and is in turn connected to a continuation 35 of the main positive line 24.

Guided for vertical sliding movement on a rod 36 which is secured to the top of the casing 12 at one end and to the base 11 at the other, in any desired manner, is an actuating bar 37, the lower end 38 of which extends through a suitable aperture in the base 11 and is adapted to co-operate with the free end of the auxiliary switch element 32. Secured to the actuating bar 37 adjacent its lower end is a horizontally extending stud or shoulder member 39 which is adapted to co-operate with the free end of the lower part of the U-shaped frame 16 in a manner and for a purpose to be later described.

At its upper end the actuating bar 37 has a horizontal extension 41 which is adapted to co-operate with and be actuated by the upper horizontally projecting end of a vertical piston rod 42 which extends through a vertical guiding and limiting slot 43 in the casing 12 and is provided exteriorly of the casing with an operating handle 44. The lower end of the piston rod 42 is secured to a plunger or piston 45 which fits snugly and is adapted for vertical movement within a hollow cylinder 46, which in turn is so secured at its lower end to the base 11 as to form an airtight connection therewith.

A compression coil spring 47 is positioned within the cylinder 46 to urge the piston 45 into its uppermost position.

Secured to the base 11 so as to form an airtight connection therewith and within and concentric with the cylinder 46 is a small hollow cylinder 48, the top end of which is closed except for an axial aperture 49 therein, the circumferential surface of which constitutes a seat for a needle valve 51. The needle valve 51 is threaded at its lower end to co-operate with the threaded bore of a supporting member 52 therefor which is secured to the under side of the base 11 and has a plurality of air outlet passages 53 therein connecting with the interior of the cylinder 48.

Rigidly secured to the lower end of the needle valve 51 is a horizontal bar 54 which extends through a slot 56 in the end of the base 11 and has an operating handle 55 secured to the end thereof. The cylinder 46 has an aperture 57 in the side wall thereof for a purpose to be later described, the cylinder 46 and associated parts comprising the timing mechanism, and the spring 47 also constituting the power means for operating the actuating member 37.

The operation of the toaster embodying my invention is as follows: Upon closing the main switch 26 by means of the handle or knob 31, a circuit is completed from the main positive line 24 through the switch 26, resistance 27, terminal 22, heating elements 21, and terminal 23 to the main negative line 25. The bread or other articles to be toasted are then placed in the rack 13 while it is in its open position, as shown in full lines in Fig. 2. Handle 44 is then depressed to its lowermost position, as seen in Fig. 1, thereby forcing air out of cylinder 46, first through aperture 57 and then past needle valve 51 and through openings 53, and compressing spring 47. The piston 45 and rod 42 will be urged upwardly by the spring 47, but will be retarded by the atmospheric pressure thereon, and will be allowed to move upwards only at a very slow rate which will depend upon the amount of air the needle valve 51 allows to be drawn back into cylinder 46. The speed of the return of these parts, which is determinative of the toasting period, may therefore be varied by adjusting the needle valve 51 by means of handle 55 in accordance with the letters appearing on the base 11 adjacent the slot 56,—"L", "M" and "D" meaning "light", "medium" and "dark", respectively, that is, a short or longer predetermined period of time before the timing mechanisms will operate the actuating member 37.

Immediately upon the setting of the timing mechanism, the member 37 and associated parts slide downwardly into the position illustrated in Fig. 1 under the force of gravity, since in normal or inoperative position (not shown in the drawing) the piston rod 42 supports the member 37 through its horizontal portion 41 in an upper position intermediate those of Figs. 1 and 2. In this intermediate position auxiliary switch elements 32 and 34 are separated, but upon the sliding downward of the member 37 to its lower position of Fig. 1, the extension 38 closes the auxiliary switch by forcing the element 32 into contact with the element 34. The closing of the auxiliary switch in effect shunts out the resistance coil 27 since it completes a circuit through the extension 35 of the positive line 24 through elements 34 and 32, terminal 22, heating elements 21, and terminal 23 to the negative line 25, and the current will follow the path of least resistance,—i. e., this latter circuit, rather than the one containing the resistance coil 27. Full current will therefore now be introduced to the heating elements 21.

Immediately upon the above described setting of the timing mechanism and cutting out of the resistance coil 27, the bread carrying rack 13 is swung into its closed position, as shown in Fig. 1, thereby placing the bread or other article to be toasted in the heating zone. In this position the inner or free end of the lower part of the U-shaped frame 16 will rest upon the extension or shoulder 39 of the actuating member 37.

The end of the predetermined time during which the bread is to be toasted will be determined by the lower surface of the piston 45 being raised past the aperture 57 in the cylinder 46. Immediately upon this condition obtaining, air is allowed to rush into the cylinder 46, allowing the spring 47 to give a sudden, sharp, upward impetus to the piston 45. The aperture 57 is so positioned that the above described action takes place before the rod 42 contacts the bar 41 which is then in its lower position, as seen in Fig. 1, in order to give rod 42 a little space in which to attain the desired momentum.

When the rod 42 strikes the bar 41 it will impart to it, and consequently to the member 39, a sufficient blow or kick to throw them into substantially the position shown in Fig. 2. The member 39 in turn will transmit this blow or kick to the frame 16 thereby throwing the bread carrying rack 13 up through the dotted line position of Fig. 2, and the rack is so balanced on its pivot 15 that it will fall into fully open position from such intermediate position due to the force of gravity, thereby carrying the toasted articles out of the heating zone. At the same time, since member 37, 38 is raised from its lowermost position, the spring 33 will raise the auxiliary switch element 32 out of contact with the element 34. This will in effect throw the resistance coil 27 in series with the heating elements 21, thereby reducing by a substantial amount the current now passing through the heating elements 21. Such an automatic reduction of current will prevent the burning out of the elements if the main switch 26 is inadvertently left on, and at the same time prevent the apparatus from cooling off between toasting operations as it would do if the current were shut off completely.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a cooking apparatus, a timing mechanism including a member adapted to be initially set and then returned slowly for a portion of its travel and rapidly for the last part of its travel, a control element normally held in inoperative position by said member, a switch adapted to be closed by said element when the latter is released by said member in the initial setting of said timing mechanism, and a bread carrier normally in inoperative position and adapted to be moved manually into operative position, said member in the last portion of its return movement imparting a sharp blow to said control element to move said bread carrier into inoperative position and allow said switch to be opened.

2. In a cooking apparatus having a heating element, a timing mechanism including a member adapted to be initially set and then returned slowly for a portion of its travel and rapidly for the last part of its travel, a control lever normally maintained in inoperative position by said member, a switch adapted to be closed by said lever when the latter is released by said member in the initial setting of said timing mechanism to increase the supply of current to said heating element, and a bread carrier normally in inoperative position and adapted to be moved manually into operative position, said member in the last portion of its return movement imparting a sharp blow to said control lever to move said bread carrier into inoperative position and allow said switch to be opened to reduce the supply of current to said heating element.

AUGUST C. PURPURA.